Nov. 12, 1968  J. T. FEDERICI ET AL  3,411,076
MOVABLE MAGNET MAGNETIC FLUX TRANSDUCER AND TRANSDUCTION
SYSTEM FOR INDICATING MAGNET POSITION
Filed Oct. 23, 1964  2 Sheets-Sheet 1

JAMES T. FEDERICI
OTTO MULLER-GIRARD
INVENTORS.

JAMES T. FEDERICI
OTTO MULLER-GIRARD
INVENTORS.

United States Patent Office 3,411,076
Patented Nov. 12, 1968

3,411,076
**MOVABLE MAGNET MAGNETIC FLUX TRANS-
DUCER AND TRANSDUCTION SYSTEM FOR
INDICATING MAGNET POSITION**
James T. Federici, Irondequoit, and Otto Muller-Girard,
Rochester, N.Y., assignors to Taylor Instrument Companies, Rochester, N.Y., a corporation of New York
Filed Oct. 23, 1964, Ser. No. 406,068
14 Claims. (Cl. 324—34)

ABSTRACT OF THE DISCLOSURE

A two-wire D.C. transmission system has a position-to-flux transducer. The transducer has a pair of magnetically-saturable parallel legs, and a magnet movable between and parallel to the legs by a fluid-pressure responsive bellows. The magnetic axis of the magnet is parallel to the legs, which have saturating windings thereon, energized by half-wave rectified A.C., and the winding senses are such that the magnet aids the A.C.-induced flux in one leg, and opposes it in the other. The legs also have bias windings energized by D.C., and wound in a sense such as to induce flux in the legs opposed to the flux induced by the magnet therein. The parameters of the transducer are adjusted so that both legs saturate simultaneously with the magnet in a given position, whereby if the magnet moves out of that position, one leg will saturate before the other. The legs also have sensing windings in which voltages are induced in opposed senses by the varying leg fluxes, till saturation. The net voltage has amplitude and sense reflecting the amount and sense of magnet position-change and is used to vary the level of D.C. in the bias windings in such sense as to restore simultaneous saturation, so that the D.C. level becomes a measure of magnet position.

---

This invention relates to magnetic flux transducers and transduction systems including such transducers.

One object of this invention is to provide a novel magnetic flux transducer for transducing position of a mechanical member to a magnetic flux condition representative of said position.

Another object of this invention is to provide a novel transduction system wherein a magnetic flux condition in a magnetic flux transducer is converted to an electric signal representative of said magnetic flux condition.

A further object of this invention is to provide a novel transduction system of the type providing a two-wire, direct current (D.C.) transmission of information represented by the position of a mechanical member from one point to another point more or less distant from the former said point.

Other objects of the invention will be evident from the detailed description and claims forming part of this application.

Figure 1:
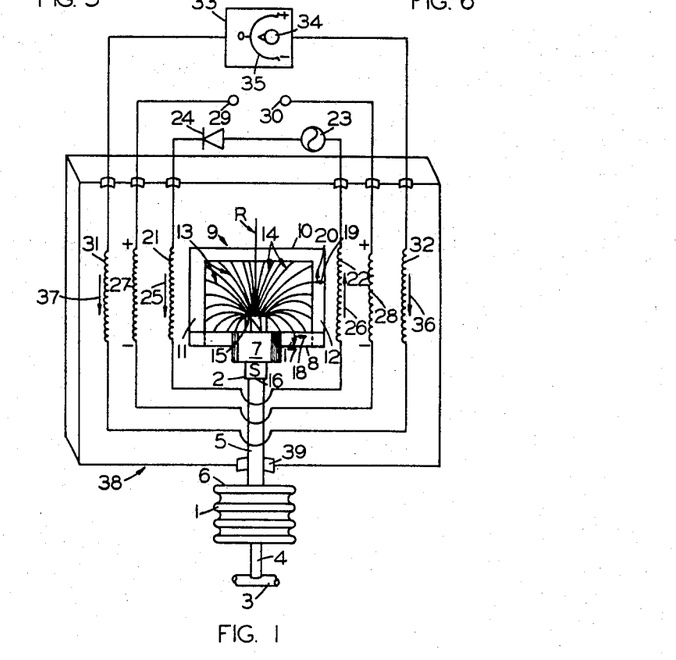
FIGURE 1 shows the basic elements of a transduction system according to the invention.

In FIGURE 1, a bellows 1 drives a bar magnet 2 to positions representative of the difference between the magnitude of a fluid pressure in the bellows and the magnitude of the fluid pressure external to said bellows. The former fluid pressure typically would be that reigning in a conduit 3, or the like, which pressure might be either of lesser or greater order than that external to the bellows, and would be conducted from the interior of the conduit 3 to the interior of bellows 1 via a pipe 4.

In order that the bellows distend, or contract, in proportion to the above-mentioned pressure difference, either the corrugated wall of the bellows will be of springy nature, and/or a separate biasing spring (not shown) opposing distention or contraction of the bellows will be provided.

As depicted in FIGURE 1, bellows volume-changes, i.e., the distentions and/or contractions of the bellows, will be confined to rectilinearity the sense of which is in the plane of the drawing and vertical, and is illustrated in FIGURE 1 by the straight line R. As the bellows would be the usual right cylindrical affair, straight line R may be taken as the cylindrical axis thereof also.

A stud 5 rigidly mounts magnet 2 on the end face 6 of bellows 1. Magnet 2 is also cylindrical and straight line R is also the cylindrical axis thereof. As indicated by the letters S and N at the ends of magnet 2, the latter is magnetized in the direction of its axis. The polarity of the magnet could be exactly the opposite of that shown, insofar as the present invention is concerned.

As the pressure in conduit 3 varies relative to the pressure external to the bellows 1, magnet 2 will be translated vertically to positions along line R that quantitatively represent the difference between the last said pressures, the arrangement typically being that motion of the bellows and its bias spring (not shown), if any, obeys Hooke's law, over a certain range of pressure difference, so that position of magnet 2 along line R bears a straight line relationship to pressure difference in said range. During this motion of magnet 2, the constraint inherent in the bellows' form confines the magnet 2 to pure translation, namely, prevents it from angular motion, from displacement in the plane of the drawing except along line R, and from displacement out of the plane of the drawing.

Figure 2:
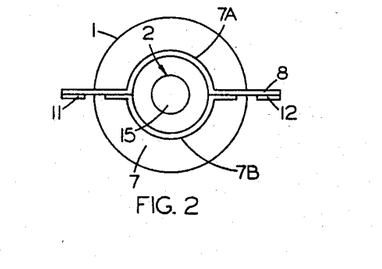
FIGURE 2 shows a detail of a magnetic flux transducer forming part of the system shown in FIGURE 1.

Bar magnet 2 is shown as projecting through an annulus 7, also cylindrical and having its cylindrical axis coincident with line R. In FIGURE 2, annulus 7 will be seen to be composed of two half-diameter sections 7A and 7B, one of which is part of a leg 8 of a core 9.

The core 9 is a one-window rectangular affair formed by the said leg 8 and legs 10, 11 and 12. The dimensions of these legs along the normal to the plane of the drawing are very small, and the core 9 may be thought of as confined to the plane of the drawing. As shown in FIGURE 1, line R bisects the legs 8 and 10 and, hence, the core. 9, therefore, is bilaterally symmetrical with respect to line R, i.e., the part of core 9 to the left of line R is the mirror image of the part of core 9 to the right of line R.

The magnetic flux line pattern of magnet 2, due to the shape of the magnet, will also be symmetrical with respect to line R. In fact, on account of the cylindrical form of magnet 2, the said pattern will be bilaterally symmetric with respect to line R in any plane containing line R. Be that as it may, the said pattern is illustrated in the plane of the drawing, and it will be seen that each flux line 13 in the plane of the core 9 and to the left of line R has its mirror image in the form of a line 14 in the plane of core 9 and to the right of line R, the said lines being shown as emerging from the end face 15 of the north pole N of magent 2.

As the lines 13 and 14 diverge from each other and from line R (they supposedly ultimately return through the space about magnet 2 to the end face 16 of the south pole S of magnet 2, though such return is not illustrated), they cut the said legs of core 9.

The core 9 consists of magnetic-flux permeable material, say Mumetal, hence, each flux line cutting the core induces or creates magnetic flux in the material of the core leg, each said line being resolvable into a first component normal to the direction of the leg and a second component normal to said first component, and both components being confined to the plane of the drawing.

Thus, the respective first and second components 17 and 18 of one line 14 are shown in leg 8, and the respective first and second components 19 and 20 of a line 14 are shown in leg 12. Any flux line cutting a leg at right angles thereto has, of course, only a first component, i.e., one normal to the leg, as for example, a flux line along line R.

In the arrangement shown, it will be evident that as magnet 2 is moved by bellows 1, the angles at which the lines 14 and 13 cut legs 11 and 12 varies. If magnet 2 moves far enough upwardly (with respect to the drawing) all said lines cutting the legs 11 and 12 will have downwardly directed second components only, and if magnet 2 is moved downwardly far enough, all said lines cutting legs 11 and 12 will have upwardly directed second components only. Obviously, too, there will be an intermediate position (say substantially that shown in FIGURE 1) where the sum of the magnitude of upwardly directed second components in leg 11 will equal the sum of downwardly directed second components, and at that point the same will be true of the second components in leg 12. (This does not necessarily mean, of course, that in such intermediate position each leg will have as many downward components as upward components and, in fact, since the legs 11 and 12 are straight, this cannot be the case for a flux pattern of the idealized form shown, for the field of the magnet drops off in intensity as one moves along legs 11 and 12 upwardly.) This intermediate position is therefore a null position in that flux from magnet 2 has no, or minimum, effect on the legs 11 and 12 insofar as second component flux, i.e., flux directed along the lengths thereof, is concerned.

Because of the core symmetry, the magnet's flux pattern symmetry, and the motion constraint of bellows 1 that confines magnet 2 to displacements along line R, each and every second component of flux in leg 11, due to lines 13 will have a sole, like counterpart second-component in leg 12 due to lines 14. Hence, the algebraic sum of second component flux in leg 11 always equals the algebraic sum of the second component flux in leg 12. Both sums will have the same sign, i.e., legs 11 and 12 will be polarized in a direction parallel to line R, and in the same sense. Thus, if the upper end of leg 11 is a north pole, the upper end of leg 12 will also be a north pole, and vice versa.

However, as the magnet displaces along line R, each said second-component varies in the same fashion. Such second-component variation according to the invention is made the basis for transduction of position of magnet 2 to a magnetic flux condition in core 9, such as is susceptible to detection and utilization as a measure of said position.

To attain such magnetic flux condition we provide the saturating windings 21 and 22, the former on leg 11, the latter on leg 12, and the two windings being connected in series with each other, and with an alternating current source 23 and a diode 24, each said winding being arranged to induce magnetic flux algebraically additive to the second component flux in the respective legs 11 and 12 on which said windings are wound. Thus, all such second component flux is parallel to line R, and so is the flux due to the windings. However, winding 21 is so wound that the direction of its flux is diametrically opposite to that of winding 22, FIGURE 1 being provided with arrows 25 and 26 showing this relationship.

As is evident from the foregoing, if either of legs 11 and 12 has a non-zero flux created therein by second components of flux lines from magnet 2, the other of said legs will also have the same magnitude and direction of flux created therein by second components of flux lines from magnet 2. Hence, such non-zero flux will be aided in one of legs 11 and 12 by flux due to one of windings 21 and 22, and opposed in the other of legs 11 and 12 by flux due to the other of windings 21 and 22.

Because of the diode 24, each leg will be magnetized for a half-cycle of A.C. source 23, and will demagnetize itself during the next half-cycle, for if winding current flows during one half-cycle, none flows in the next half-cycle. This process is repeated indefinitely, as long as A.C. source 23 is energizing windings 21 and 22 via diode 24. Each of legs 11 and 12 will, therefore, execute B–H loops, but always in the same quadrant, since due to the diode, the direction of magnetization by windings 21 and 22 never reverses in either leg.

In order to modulate the periodic energization (magnetization and demagnetization cycles) of legs 11 and 12 by the above described variation of second component flux in legs 11 and 12 due to flux lines from magnet 2, the amplitude of the A.C. source, saturating winding ampere turns, leg dimensions, leg material, etc., are set so that in the absence of any other magnetic flux in legs 11 and 12, each of legs 11 and 12 will be saturated during the half-cycle in which current from source 23 flows through saturating windings 21 and 22. By saturation, it is meant that enough flux directed along the length of the legs 11 and 12 is created to magnetize said legs to the utmost, i.e., as a rule of thumb, the legs 11 and 12 are driven from the steep, increasing parts of their B–H loops to the low-slope, increasing parts thereof.

Supposing magnet 2, as shown, to be in a position where the net second component flux due to flux lines from magnet 2 is zero in each leg, then each of legs 11 and 12 will saturate at the same instant in every other half-cycle of A.C. source 23. If, however, magnet 2 be translated in one direction or the other along line R to a new position, then each of said legs will have the same value and direction of second component flux created therein by the magnet 2. Accordingly, one of legs 11 and 12 will saturate earlier in the half-cycle, at an instant in said half-cycle that corresponds to the said new position of magnet 2. The other of legs 11 and 12 will saturate later in that half-cycle, or even not at all. Hence, the rate of magnetic flux build-up in said other of legs 11 and 12 during the half-cycle of energization will not be as high therein as when said net second component flux was zero, i.e., when the magnet 2 was in the null position FIGURE 1 is being supposed to show.

Since the null position of magnet 2 corresponds to a definite point on line R, and since which leg saturates earlier depends on which direction magnet 2 moves along line R away from said point it is evident that the periodic, half-cycle flux pulsations produced in legs 11 and 12 are modulated in accordance with magnet position and in such fashion as to uniquely correspond and identify the sense and magnitude of the displacement of magnet 2 along line R from said definite point. These modulated flux pulsations therefore define the above-mentioned magnetic flux condition.

In order to sense such magnetic flux condition, sensing windings 27 and 28 are provided, wound in such fashion that only changes in second component flux in legs 11 and 12, and change in flux in legs 11 and 12 that have the second component direction, induce voltages in said sensing windings, and that a given magnitude of flux change in the second component direction would induce voltage of the same magnitude in either winding, if such flux change occurred in the leg corresponding to that winding. Accordingly, by connecting the windings 27 and 28 in series with the polarities indicated by the plus and minus symbols shown in FIGURE 1, at the ends of windings 27 and 28 (which polarities represent those of the voltage across winding 27 and the voltage across winding 28 for some given half-cycle of energization of windings 21 and 22), it will be evident that zero voltage will exist between terminals 29 and 30 of the respective windings 27 and 28, if the only flux in core legs 11 and 12, in the second component sense, is that due to windings 21 and 22. The windings, etc., could be arranged, of course, so that all the polarities are the reverse of those illustrated, which is a mere matter of choice.

Due to the symmetry of the transducer structure, this same condition of zero voltage obtains in the null position FIGURE 1 illustrates. However, if magnet 2 is displaced along line R to a new position, the algebraic sum of voltage across winding 27 and voltage across winding 28 will differ at some point in the half-cycle when current flows through the staturating windings 21 and 22. Since the sensing winding voltages are proportional to the rate of change in the fluxes producing them, the sensing winding on that one of legs 11 and 12 that saturates earlier will have a voltage of lesser magnitude induced therein than will be induced in the winding of the other leg, which saturates later, or even not at all.

Therefore, there will be a net, non-zero voltage across terminals 29 and 30 that will correspond in magnitude to how far magnet 2 is moved out of null position and in sign to the direction it has been moved out of null position.

From all that has been described thus far, it is obvious that the voltage across terminals 29 and 30 is a quantitative measure of the difference between the magnitude of fluid pressure in conduit 3 and the magnitude of that fluid pressure external to bellows 1, and has the sign of such difference.

It is preferable, however, to work in terms of electrical current rather than of voltage. In this case, this is done, in effect, by converting the voltage across terminals 29 and 30 to direct current corresponding thereto in sign and magnitude. By so doing, a negative feedback loop can be provided for the transducer, which is advantageous for the usual reasons. For such purposes, feedback windings 31 and 32 are provided on legs 11 and 12 and arranged so that when a direct current flows therethrough, flux will be created thereby in legs 11 and 12 having a direction opposite to that of the second component flux due to magnet 2, said feedback windings being alike as to ampere turns, etc., so that the same magnitude of flux is created in each of legs 11 and 12 when the feedback windings are connected in series with each other and with a source of D.C. Negative feedback may then be provided by adjusting the said source of D.C. so as to provide a current in windings 31 and 32 of such magnitude and sign as will produce fluxes in legs 11 and 12 substantially exactly neutralizing the fluxes in legs 11 and 12 due to magnet 2. As will be seen further on hereinbelow, circuitry as yet undescribed provides such source of D.C. under control of the voltage across terminals 29 and 30. Insofar as FIGURE 1 is concerned, however, the D.C. feedback source is represented merely by a box 33 connected in series with series-connected windings 31 and 32. The box 33 is illustrated as having a control knob 34 which may be turned to various positions with respect to a scale 35 to produce such magnitudes and sense of D.C. as may be necessary to produce a current such as will cause windings 31 and 32 to balance out the second component flux in legs 11 and 12 due to flux lines from magnet 2. The sense and magnitude of such current may be supposed to be readable on scale 35, when the voltage across terminals 29 and 30 is zero.

The sense of winding of windings 31 and 32 is exemplified by the arrows 36 and 37. As in the case of arrows 25 and 26, arrows 36 and 37 indicate the sense in which feedback current polarizes the legs 11 and 12. However, unlike windings 21 and 22, the polarization is the same in each leg, as the arrows 36 and 37 indicate. The arrows, as shown, are, of course, for a given sense of current flow, and both would be reversed if the sense of such current flow were reverse to the said given sense.

In the foregoing, the transducer has been treated purely from the point of view of the flux of magnet 2 that cuts the legs 11 and 12 in the plane of the drawing. In reality, of course, the core 9 is not of zero thickness. However, with a magnet having symmetry of flux pattern as defined previously, the core could have quite substantial extent above and/or below the plane without affecting the symmetry of action of magnet 2 on legs 11 and 12. In a typical case, however, the core 9 is sufficiently close to zero thickness that the magnet cross-section is not critical as to shape. As a general rule, it is desirable to minimize dimensions and amount of core material for compactness, ease of saturation and so on.

Core 9 being a closed loop of magnetic material, it is obvious that some flux reaches legs 11 and 12 via legs 8 and 10. However, that due to leg 10 is relatively little and does not change much as magnet 2 moves. That due to leg 8 is also small since the flux-lines remain always very nearly at right angles thereto, i.e., second components in leg 8 (namely, those directed along the length of the leg) remain very small, as do those in leg 10.

Moreover, second components in leg 8 oppose second components in leg 10, insofar as these may both be conducted around the core to legs 11 and 12 and also have a second component sense in the latter legs.

Magnet 2, being a real magnet, has secondary poles along the sides thereof which do appear to be able to contribute significantly to the second component flux in legs 11 and 12. Thus, in the absense of annulus 7, the graphic relationship between magnet position and transducer output, all other things being equal, would be curved. Such curvature is controlled by annulus 7, basically in accordance with how much of the axial length of the magnet is enveloped by annulus 7. In a typical case, an annulus 7 sufficiently long to cover most of the magnet length suffices to make the aforesaid relationship a straight line.

It is to be noted, however, that basic principle of operation of the transducer is independent if the presence or absence of annulus 7, and indeed of either or both of legs 8 and 10. In fact, the core legs do not ever need to be more than clamped together at their ends in order for the transducer to operate as described, including the linearization action of annulus 7. Moreover, a simple rectangular closed core would do (i.e., one with leg 8 replaced by a plain element like leg 10), if the magnet 2 were displaced normal to the plane thereof (i.e., the plane of FIGURE 1) enough to allow the magnet to clear the leg thereof corresponding to leg 8 so that magnet motion due to bellows 1 would take place along a line which is parallel to line R and which lies in a plane parallel to the plane of the drawing.

In systems such as these it is customary to provide some means of adjustment of the relation between change in magnet position and the consequent change in feedback current.

All other things being equal, the product of the field strength of magnet 2 and the span, in a given position of magnet 2, is substantially a constant, though the field strength of magnet 2 be changed over a wide range. Hence, the span of the transduction system, namely the distance on line R represented by a given feedback current change, may be established, or adjusted by choosing a magnet 2 of the correct field strength.

Again, the span may be adjusted by shunting a known fraction of the feedback current around windings 31 and 32 via a resistance. Somewhat similarly, the ampere turns of windings 31 and 32 may be adjusted, in effect, by tapping said windings at various points and connecting said windings in the feedback circuit via intermediate portions of the winding.

As expedients such as the foregoing are not new in themselves and the provision of such is within the skill of the art, applicants do not believe it is necessary to illustrate them or to further discuss them.

In practice, desired total magnet displacement, with linearity between magnet position and transducer output may range from 0.030 inch to 0.12 inch. This sort of performance is readily obtained with repeatability, linearity, hysteresis, temperature effects, of such nature as provide accuracy of a fraction of a percent full-scale displacement. While at first sight one might suppose that the legs 11 and 12 are rather poorly situated for having flux created therein in significant amount by magnet 2, the opposite is rather the case, for we have found that magnets having conventional values of field strengths (10,000 gauss and up for types such as Alnico V, VII and VIII and so on) are much too powerful in the transducer arrangement shown when realized in design dimensions of the sort specified hereinafter.

As these design dimensions are calculated to minimize power requirements, to achieve compactness, and so on, it results that the core 9 saturates at low magnetic field intensities, and hence the distance along R through which magnet 2 may move without saturating the core is generally too small for our purposes, if the magnet's field strength is of the usual order.

We find that to get a reasonable range of magnet disment before the legs saturate due to second component flux of the magnet, the magnet should typically be around 2,000 gauss. An Alnico V rod, in conventional practice, is initially magnetized to around 12,000 gauss and is then "knocked down," as it is said, to around 10,000 gauss, its final strength. An otherwise identical rod, slated for use as magnet 2, would be treated exactly the same, except that it would be knocked down to a final value of about 2,000 gauss at the pole faces 15 and 16.

The transducer of FIGURE 1 is sensitive to magnetic flux fields in general, hence, in order to cut it off from the earth's field and disturbances therein, such as may be caused by passage nearby of ferrous objects, and so on, magnetic shielding 38 may be provided. Such shield is essentially a box of Mumetal or the like and according to FIGURE 1 is provided with some means such as holes, for example, for transferring motion of bellows 1 to magnet 2 through the wall of the box, as at 39, for making connections to windings, etc.

Except for magnet 2, and core 9, everything inside shield 38 should be non-magnetic, including hardware used in holding the transducer parts in assembled relation, coil forms for windings, electrostatic shielding for the windings, if such shielding be provided.

Preferably, the windings of each leg are wound on top of each other, feedback winding first, next the sensing winding, and last, the saturating winding. Electrostatic shielding may be placed between next-adjacent windings. Such shielding should float, and be split down their sides to avoid forming shorted turns around core legs. The windings may be supported on non-magnetic bobbins (not shown) of plastic, stainless steel or the like, which in turn slip over and envelope most of the lengths of the legs 11 and 12. Conductive bobbins, if used, should be split down their sides to avoid shorted turns around the core legs.

Figure 3:
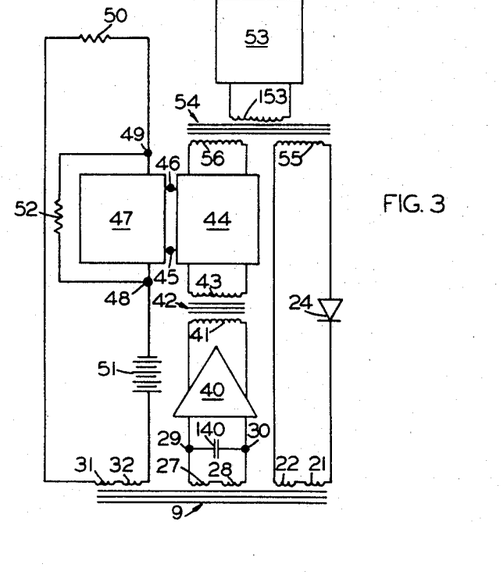
FIGURE 3 shows an amplifier, demodulator, regulator, oscillator and transducer arrangement providing a transduction system in accordance with the invention.

FIGURE 3 schematically illustrates a transduction system according to the invention wherein the feedback current through windings 31 and 32 is controlled in response to the voltage across terminals 29 and 30 of sensing windings 27 and 28. The core 9 is represented in FIGURE 3 by the conventional symbol for a transformer core, and diode 24 and saturating windings 21 and 22 are shown in the figure as well as the windings 27, 28, 31 and 32, and terminals 29 and 30.

In this case, an A.C. amplifier 40 (A.C. because the voltage to be amplified is periodic) is provided, the input of which is the voltage across terminals 29 and 30, and the output of which is an amplified voltage across winding 41 of a transformer 42, which has another winding 43, the voltage across which is applied to a phase sensitive demodulator 44, demodulator 44 having output terminals 45 and 46 across which a D.C. voltage appears which is a function of the voltage across terminals 29 and 30 and has a polarity corresponding to the polarity of the latter. A capacitor 140 is connected across the input to amplifier 40 to integrate the pulsing voltage across terminals 29 and 30. This expedient, together with suitable filtering (not represented in FIGURE 3) at the demodulator output causes the demodulator output voltage to be a reasonably smooth steady D.C. proportional to the average voltage across terminals 29 and 30. It is to be observed that the position of magnet 2 is reflected both in the amplitude and time-length of the voltage pulses appearing across terminals 29 and 30, or in other words, the area or time integral of the said pulses is a function of magnet position. Hence, capacitor 140, though it reduces the height of the pulses, preserves the time-amplitude product of the information represented by the voltage across terminals 29 and 30.

The voltage across terminals 45 and 46 is used to control a series-current regulator 47 through which flows the feedback current in coils 31 and 32, via regulator terminals 48 and 49, the source of such current being a battery 51, and there being provided a resistance 50 through which said current also flows.

Resistance 50 represents a useful load such as a D.C. ammeter, a D.C. operated valve positioner, or the like, which it is desired to operate as a function of the feedback current in windings 31 and 32.

As will be apparent from the foregoing, the regulated feedback circuit in FIGURE 3 is not simply an automation of the corresponding feedback circuit of FIGURE 1, for battery 51 can obviously furnish current in but one direction. While such automatization is feasible and within the realm of our invention, in practice, the situation in FIGURE 3 is often to be preferred, namely, that the feedback current never changes its sense over the entire range of its variation in magnitude. Such result is obtained simply by adjusting the parts of the transducer such that bellows 1, or the like, never moves the magnet 2 into a position where the polarity of the voltage across terminals 29 and 30 reverses. In other words, the previously described neutral or intermediate position of magnet 2 with respect to core 9 will become a limit of the range of movement of magnet 2, or will even be outside the said range.

It is easy to see, therefore, that by suitable choice of winding sense of windings 31 and 32, relative polarities of the various connections, relation of current regulating action to the voltage controlling the regulator action, and/or the like, the current through windings 31 and 32 will have a sense such as to produce flux in the second component sense in legs 11 and 12, but oppositely directed to the second component flux due to magnet 2 which produces the voltage across terminals 29 and 30. As will be evident to those familiar with negative feedback devices, the magnitude of the D.C. current through load resistance 50 will automatically correspond at all times to the position of magnet 2.

FIGURE 3 shows a fixed resistance 52 shunted around regulator 47. Among other things, the resistor serves to establish one end of the desired range of current through load resistance 50. Typically, such a range today is 1 ma. to 5 ma. By proper choice of resistance 52, it is readily arranged that the current through resistance 52 and the least current through regulator 47 together total 1 ma. With the range of the 1 ma. type, normally the bellows 1, etc., are so positioned that at some reference value of difference in pressure (which might be zero, approximately atmospheric, and so on) 1 ma. flows through the load resistance 50. In other words, the zero position of magnet 2 is set, not at the position where second component flux in legs 11 and 12 is zero, but where a current of 1 ma. in windings 31 and 32 is necessary to balance out the second component flux. As this practice is familiar in the prior art, it need not be discussed further herein.

Resistance 52 also prevents regulator 47 from being turned off, so to speak. Regulator 47 represents, functionally speaking, a series resistance much larger than the net resistance of the remainder of the current feedback loop at all times, and is the larger, the smaller the feedback current. If the feedback current becomes sufficiently small, the said series resistance becomes approximately infinite, or at least great enough that the regulating action may cease. In most practically-realizable series regulator circuits, the regulating action cannot be restored by means of an otherwise suitable voltage across terminals 45 and 46. Resistance 52, however, keeps the regulating action alive since regardless of what the voltage across terminals 45 and 46 call for, the 1 ma. basic current in the feedback loop remains under regulation, so that the regulator cannot be turned off, as by magnet 2 moving to a position such that zero voltage appears across the terminals 45 and 46.

The source of A.C. power for the system is denoted by box 53, representing an oscillator coupled via windings 153 and 56 of a transformer 54 to the demodulator 44. Saturating windings 21 and 22 connect via diode 24 to winding 55 of transformer 54. Winding 55 thus corresponds to A.C. source 23 of FIGURE 1. The frequency of the output of amplifier 40 is the same as that of oscillator 53, hence the latter provides via winding 56 a reference signal for demodulator 44, in accordance with conventional practices in phase sensitive demodulation.

Figure 4:
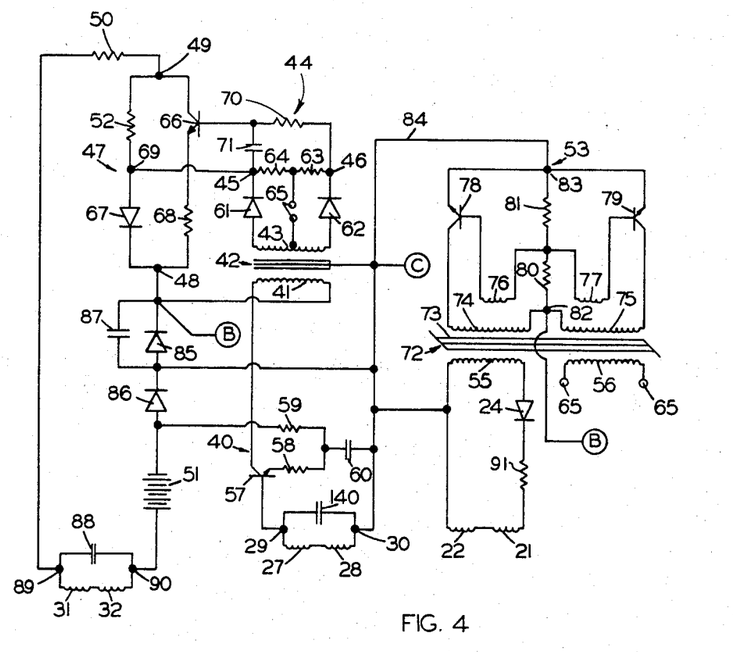
FIGURE 4 shows a particular circuit embodying the arrangement of FIGURE 3.

FIGURE 4 illustrates one specific circuit form the broadly sketched system of FIGURE 3 may take. To begin with, amplifier 40 consists essentially of a transistor 57, a resistor 58, a resistor 59 and a capacitor 60. Demodulator 44 consists essentially of a pair of solid state diodes 61 and 62 and a pair of resistors 63 and 64, there being shown a pair of terminals 65 which are to be supposed as connected to the winding 56 to the like-numbered terminals of winding 56 energized by oscillator 53 in order to supply the oscillator output across the center of winding 43 and the junction of resistors 63 and 64, as depicted in the drawing. As should be obvious, those parts shown in FIGURE 4 as are denoted by reference numerals used in FIGURE 3 are as described in connection with FIGURE 3. For example, the last-mentioned winding 43 is the output winding of transformer 42 as described in FIGURE 3, which transformer is also included in present FIGURE 4.

Regulator 47 consists essentially of a transistor 66, a solid state diode 67 and a resistor 68. The demodulator output terminal 45 is connected to the junction 69 of diode 67 and resistor 52, and the demodulator output terminal 46 is connected via resistance 70 and to the base of transistor 66. Resistance 70 and a capacitor 71 across terminals 45 and 46 act as smoothing filter for the demodulating output voltage.

In the case of oscillator 53, the transformer 72 having windings 55 and 56, apart from the last said windings, is quite different than indicated in FIGURE 3 by the showing therein of corresponding transformer 54. Thus, as the illustrated form of core 73 symbolizes, the core is composed of so-called square loop magnetic material. In place of winding 153 of the simple form shown in FIGURE 3, a set of windings 74 through 77 are provided on core 73. One end of winding 74 is connected to the collector of a transistor 78, and one end of winding 76 is connected to the base of transistor 78. Likewise, respective ends of windings 75 and 77 are connected to the collector and the base respectively, or a transistor 79. The remaining ends of windings 74 and 75 are connected to one end of a resistor 80, and the remaining ends of windings 76 and 77 are connected to the remaining end of resistor 80.

The emitters of transistors 78 and 79 are connected together and to one end of a resistor 81, and the remaining end of resistor 81 is connected to the aforesaid remaining end of resistor 80.

The battery 51 serves as a common source of power for the entire circuit, as well as of the feedback current through windings 31 and 32. Thus, in the case of oscillator 53, the junction 82 of resistor 80 and windings 74 and 75 is connected to a point B, which point B is essentially terminal 48 of regulator 47. The junction 83 of resistor 81 and the emitters of transistors 78 and 79 are connected to what amounts to a reference line serving, as indicated at C, as a circuit common which may be variously at ground, chassis or other potential. In order to provide for a proper division and regulation of the biases needed by amplifier 40 and oscillator 53, series-connected Zener diodes 85 and 86 are provided interposed between the cathode of battery 51 and the regulator terminal 48. Since the demand for power from the oscillator (because of diode 24) exists only on alternate half-cycles, storage capacitor 87 is provided across diode 85, in order to prevent transients arising when the half-cycle of conduction via diode 24 begins.

Again, to prevent A.C. feedback to the transducer, a capacitor 88 is shunted across the terminals 89 and 90 of feedback windings 31 and 32 in order to bypass ripple therearound.

More or less resistance 90 may be needed in series with diode 24 in order to limit the current in the saturating winding circuit to such values that oscillations are maintained by the oscillator 53.

It wll be noted that the junction 69 of resistance 52, which latter has in FIGURE 4 the same function assigned to it as in FIGURE 3, is apparently the counterpart of terminal 48 as positioned in FIGURE 3. However, this is only due to the presence of diode 67 which is not basically necessary to the action of the regulator circuit shown in FIGURE 4. Without diode 67, terminals 48 and 69 in FIGURE 4 would be the same. However, there is an emitter to base voltage drop in transistor 66 that, without diode 67, would have to be supplied by the demodulator output before regulator action occurred. Diode 67, accordingly, is chosen so that it supplies approximately such voltage drop, thereby reducing the voltage required from the combination of amplifier 40 and demodulator 44.

The presence of diode 67 is also advantageous in that it is chosen to have a temperature coefficient like that of the emitter-base drop of transistor 66 so that the current regulating action of regulator 47 is temperature-stabilized. This will be the case if, for example, both diodes 67 and transistor 66 are silicon types The oscillator 53 of FIGURE 4 is a square wave oscillator. Windings 74 and 75 of its transformer 72 are actually equal parts of a single winding, the sense of which is uniform. Likewise as to windings 76 and 77, except that winding sense in their case is opposite to the former said sense.

The actual wave form of the oscillator is not critical so long as it remains substantially the same from one half-cycle of energization of windings 21 and 22 to the next. Square wave excitation is rather most convenient in that the time of saturation is substantially unaffected by temperature, in contrast to, say, a triangular or saw tooth wave wtih a sloping leading edge.

With sine wave excitation, normally the arrangement would be such that saturation occurs in the steeper part of the energization half-cycle, which means that the remainder of the wave form is clipped, making it, in effect, a fair approximation of a square wave, hence, it is not worth what is the somewhat troublesome design problem of getting a sine wave output from an oscillator. On the other hand, it is relatively easy to design an oscillator whose output wave form has leading edges steep enough to be substantially square, particularly since ringing and other vagaries of wave form, following such leading edges, can be tolerated within wide limits.

As pointed out before, the information as to position of magnet 2 is contained in the area under the voltage pulses across terminals 29 and 30. The arrangements of FIGURES 3 and 4, due to capacitor 140 inherently act to extract the information represented by this area from the said voltage pulses. However, from the immediately preceding discussion, it will be seen that the partition of the dimensions of this area (which is the time integral of a voltage) between time and voltage, depends to considerable extent on the wave form of the current through windings 21 and 22.

It will therefore be apparent that windings could be energized with pulses of approximately zero duration, for in this case, magnet position would be represented mainly by the amplitude of the net voltage across terminals 29 and 30. Here, the amplifier and other circuitry between regulator 47 and windings 27 and 28 could then be designed to produce an output representing the envelope of the voltage pulses across terminals 29 and 30.

Again, supposing the excitation of windings 21 and 22 to have a gradually rising wave front, say such that there is a position of magnet 2 wherein both of legs 11 and 12 saturate exactly half-way in the half-cycle of energization, it is obvious that movement of the magnet 2 out of the last said position into a new position will create a phase difference between consecutive pulses of the voltage across terminals 29 and 30, the magnitude of which phase difference will represent the new position of the magnitude. In such case, circuitry could then be provided such as would furnish to regulator 47 an output representing the magnitude of such phase difference.

Such modifications as these are believed to be within the scope of our invention, and as they represent applications of known expedients for characterizing information signals and extracting such information from such signals, we do not deem it necessary to discuss specific forms of such modifications. It should be noted, however, that in the usual case, it is more practical, efficient and simple to utilize the area of the pulses across voltages 29 and 30.

By way of example, the following is a list of values the parts of FIGURE 4 have in one actual example:

| | | |
|---|---|---|
| Load Resistance | 50 | 0 to 3,000 ohms. |
| Do | 52 | 36,000 ohms. |
| Do | 58 | 100 ohms. |
| Do | 59 | 47,000 ohms. |
| Do | 63 | 6,800 ohms. |
| Do | 64 | Do. |
| Do | 68 | 100 ohms. |
| Do | 70 | 6,800 ohms. |
| Do | 80 | 240,000 ohms. |
| Do | 81 | 10,000 ohms. |
| Do | 90 | 22 ohms. |
| Capacitor | 140 | 0.02 microfarad. |
| Do | 60 | 50 microfarads. |
| Do | 71 | 20 microfarads. |
| Do | 87 | 100 microfarads. |
| Do | 88 | 10 microfarads. |
| Winding | 41 | 3,800 turns, insulated copper wire, AWG #36. |
| Do | 43 | 8,000 turns, insulated copper wire, AWG #38, center tapped. |
| Do | 55 | 400 turns, insulated copper wire, AWG #40. |
| Do | 56 | 880 turns, insulated copper wire, AWG #40. |
| Do | 74 | 3,000 turns, insulated copper wire, AWG #40. |
| Do | 75 | Do. |
| Do | 76 | 200 turns, insulated copper wire, AWG #40. |
| Do | 77 | Do. |
| Battery | 51 | 48±5 volts. |
| Diode | 24 | IN456. |
| Do | 61 | IN456. |
| Do | 62 | IN456. |
| Do | 67 | IN456. |
| Do | 85 | 15 volt Zener. |
| Do | 86 | 10 volt Zener. |
| Transistor | 57 | 2N336A. |
| Do | 66 | 2N336A. |
| Do | 78 | 2N336A. |
| Do | 79 | 2N336A. |
| Core | 73 | E–I form, 50057-ID, Magnetics, Inc. |
| Do | 42 | E–I form, conventional silicon steel. |

The excitation frequency of oscillator 53, constructed as shown, and using the values recited above for the parts thereof, is about 400 cycles per second. Frequently, however, is not critical and, for example, operation can be at 60 cycles per second, or at 1000 cycles per second.

A typical transducer of the form shown in FIGURES 1 and 2 has a core 9 the rectanular outer dimensions of which are 1 inch by 1¼ inch, the annulus 7 being ⅜ inch in axial length, thereby increasing making the overall dimensions of core 9 to 1¼ inch by about 1¼ inch. The leg 8, except for part 7a, is 7/64 inch wide, part 7b being dimensioned correspondingly as to width. Legs 10, 11 and 12, however, are 7/128 inch wide. All parts of the core are stampings of sheet Mumetal (type 908. Allegheny Ludlum Steel Corp.), 0.014 inch thick. The outer diameter of annulus 7 is 9/32 inch.

As is well known, Mumetal is a magnetic material which, when properly annealed, has low retentivity, high permeability and a narrow hysteresis loop. As a result, it saturates readily and contributes little hysteresis error to system performance. Other magnetic materials having equivalent properties could be used, of course.

Core 9 is initially constructed as three distinct parts: a U-shaped part defining legs 10, 11 and 12, the leg 8 including part 7a formed therein, and a part 7b which is subsequently spot welded to leg 8 to form annulus 7.

After annulus 7 is thus formed, the resultant two parts which form the core are annealed in accordance with the material supplier's recommendations for so doing. The forming process affects the magnetic properties of the core material, hence annealing after forming is necessary to assure that the finished core has the desired magnetic properties.

The windings 21 et al., are wound on bobbins which are slipped over legs 11 and 12. The aforesaid two parts are then mounted in place in the geometry indicated in FIGURES 1 and 2, the whole being lightly but firmly clamped into fixed configuration, avoiding stressing and/or distortion of core parts. As there is no need for efficient transfer of flux via legs 8 and 10 to legs 11 and 12, it is not necessary to be concerned with providing low reluctance paths where legs 11 and 12 overlap leg 8. On the other hand, a low reluctance loop is desired around annulus 7, hence, as remarked supra, parts 7a and 7b are spot welded together at both their 7/16 inch end portions. In practice, the apparent continuity of the core is mainly useful as a geometrical guide assuring proper orientation of annulus 7 with legs 11 and 12 and with magnet 2.

In this case also, magnet 2 is a cast Alnico VIIa bar of about 1450 gauss, the bar being in the form of a 3/16 inch-diameter cylinder having a length to diameter ratio of substantially 4.3 to 1, this ratio being that at which the temperature coefficient of the magnet's remanence is accepably small.

Feedback windings 31 and 32 were each 1800 turns of AWG #41 insulated copper wire.

Saturating windings 21 and 22 were each 1000 turns AWG #38 insulated copper wire.

Sensing windings 27 and 28 were each 5000 turns of AWG #41 insulated copper wire.

In order to season the transducer after it has been assembled, magnet 2 is cycled two or three times over a motion range about three times greater than that desired in practice, and then several times over the desired range. Overrange-preventing stops (not shown) may then be provided to confine the magnet's motion to the desired range, as subsequent overrange can produce a slight error in the current through load resistance 50. Prior to assembly, the magnet 2 may be temperature-cycled to stabilize its temperature coefficient of remanence.

Figure 5:
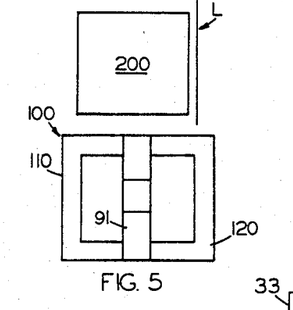
FIGURES 5 and 6 show the basic elements of a modified form of magnetic flux transducer.
Figure 6:
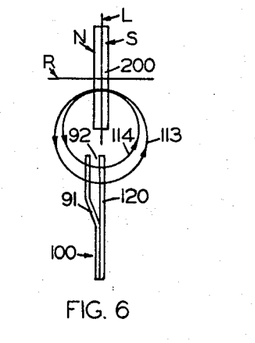

FIGURES 5 and 6 illustrate another form of flux transducer that may be used in a fashion similar to that in which the transducer of FIGURES 1 and 2 is used. In this case, a one-window rectangular core 100 is provided including the two parallel legs 110 and 120, which correspond respectively to legs 11 and 12 of the core 9. Thus, as in the case of the earlier described transducer, the several saturating sensing and feedback windings would be wound on legs 110 and 120, analogous to the case of legs 11 and 12. A central leg 91 is also provided, bent as shown in FIGURE 6 so that one end of said leg 91 can be secured flat to core 100, whereas the other end of leg 91 extends over the core 100 and parallel to the plane to define an air gap 92.

A magnet 200, corresponding to magnet 2 is also provided. The magnet 200, however, is a rectangular parallelipiped that is quite short in one dimension as compared to its other dimensions, the short dimensions lying along the line R defining the path of motion of magnet 200, just as line R defines the path of motion of magnet 2 in FIGURES 1 and 2, but with the plane of core 100 lying normal to line R. Magnet 200 is polarized so that the axis of its poles are aligned with line R, line R being also the center line of the magnet body the large faces of magnet 200, and said faces being normal to line R. The edges of leg 120 and magnet 200 that are exposed to view in FIGURE 6 are both bisected along their long dimensions by a common plane normal to the plane of the figure and to line R, a segment of a line L in said common plane being shown in FIGURES 5 and 6. A second common plane, normal to the previously-said common plane also bisects both core and magnet along the longer dimension of FIGURE 5, and the said line L is parallel to said second common plane.

The flux pattern of magnet 200, taken in the said second common plane in bilaterally-symmetric with respect to line R, and takes the form of more or less circular arcs of varying diameters, whose centers lie on line L, there being shown two such arcs denoted by the reference numerals 113 and 114.

It will be evident that the line L, if continued, bisects the arcs 113 and 114, intersecting the arcs (whether they are actually circular or not) at right angles. Therefore, in the position shown in FIGURE 6, the net flux in core 100 in directions lying in the plane which contains line L and lies at right angles to line R, will be zero, and very nearly zero in core 100, since, as in the case of core 9, it will be quite thin. Moreover, the flux pattern in any plane parallel to both lines R and L will be symmetrical about a line which is parallel to line R and in the plane which contains line L and lies at right angles to line R. Hence, none of the flux lines cutting core 100 will produce any flux in the core in the last said plane.

Consequently, if core 100 be provided with the various windings, etc., as in the case of core 9, then the configuration of FIGURE 6 represents a neutral or zero position, since substantially zero net voltage would be induced in what would be the sensing windings wound on the core 100.

If, however, magnet 200 be displaced parallel to itself along line R to a new position with respect to line R, non-zero net flux will be created in the core 100. Thus, if magnet 200 be displaced to the left (with respect to the drawing), the flux lines 113 and 114 will cut leg 120 at an angle such that flux components will be created all directed upwardly in leg 120. If the displacement is to the right, the flux components will be directed downwardly in leg 120.

The greater such displacement, the greater is the amount of flux created in leg 120. Due to the symmetry of the core-magnet geometry, the same thing occurs in leg 110. Hence, the transducer represented in FIGURES 5 and 6 will operate in accordance with the same principles as does its previously-described counterpart of FIGURES 1 and 2, and can therefore also be utilized in the transduction systems, and circuitry, set forth in connection with the previously-described transducer. The basic difference between the two transducers, in the last analysis is that axis of polarization of the magnet in the one case is normal to the plane of the transducer core and in the other, is parallel thereto (actually, as shown, it is in the same plane, but as asserted previously can be to one side thereof, and therefore parallel thereto).

The center leg 91 of core 100 corresponds to annulus 7 of core 9, in that it is used to adjust the linearity of the relationship of magnet position with respect to transducer output. Such adjustment is done on an empirical basis, and the leg 91 is otherwise unnecessary.

The adjustment effect is partly a function of the width of the gap 92 and of the shape of the offset end of leg 91 (looking at it from the point of view of FIG. 5). For example, if magnet 200 were a short cylinder, so that the face thereof visible in FIG. 5 was circular, then the right-hand end of leg 91 would be in the form of an approximately semi-annular arc (looking from the point of view of FIG. 5) concave side toward magnet 200 and its larger radius being about the same as the radius of magnet 200.

While neither the effect of leg 91 (nor of annulus 7) can be precisely explained, it is evident that each of the transducers disclosed defines a distributed magnetic circuit, hence the main concern is with distortions of the field in a limited volume containing the transducer. For example, the leg 91 will introduce a slight flux pattern assymmetry with respect to the bisector plane containing line L, looking at the transducer from the point of view of FIG. 6. The limited volume referred to supra is essentially that of a shielding box 38 of such shape and dimensions that the effect of the walls of the box on the magnetic circuit is just barely not appreciable.

In order to comply with the statute, hereinabove the invention has been set forth in extensive detail. Whereas such detail is to be taken as illustrative and exemplary, the claims appended hereto are to be looked to in order to determine the breadth and scope of protection which the present invention should be granted.

We claim:

1. A transduction system including a magnetic flux transducer, said magnetic flux transducer comprising a bilaterally symmetric leg pair, each leg of said leg pair being made of magnetically saturable material; a magnet, said magnet having a bilaterally symmetric flux line pattern in a given plane and the flux lines of said pattern diverging away from the line of symmetry of said pattern on both sides of said line of summetry, and from each other; said leg pair and said magnet being so positioned with respect to each other that flux lines of said magnet intersect said legs and that a plane of symmetry of said leg pair perpendicularly intersects a further plane, said further plane being perpendicularly intersected by said given plane, said further plane also containing said line of symmetry and said further plane also containing a line of symmetry of said leg pair; mechanism including constraint preventing motion of said magnet as would deflect the first said line of symmetry out of said further plane means for sensing flux conditions in said leg pair due to said magnet, and producing an output in response thereto, said system also including feedback, means adjustable to create a magnetic flux corresponding to said output in each of said leg pair that is equal in magnitude and opposed in sense to that created in each of said leg pair by flux lines of said magnet, said feedback means producing a signal the magnitude of which represents the amount of magnetic flux created thereby.

2. The transduction system of claim 1, wherein said feedback means includes a regulating means, windings and means for causing a direct current to flow through said windings, said windings being so arranged on said leg pair that said direct curent produces the last said magnetic flux in a sense opposing magnetic flux created in said leg pair by said magnet; said regulating means being effectively responsive to magnetic flux change in said leg pair to cause the magnitude of said direct current to be such that the magnitude of said last said magnetic flux to change in such amount as to neutralize such magnetic flux change, whereby said direct current is said signal.

3. The transduction system of claim 1, wherein said feedback means includes a winding, a D.C. source of voltage, a load resistance and a regulator in the nature of a variable resistance; said winding, said D.C. source, said load resistance and said regulator being connected in series to form a closed loop in which flows a direct current; said winding being so arranged that said direct current causes the last said magnetic flux to have a sense opposing that created in said leg by said magnet, and said direct current having a magnitude that is a function of the magnitude of said variable resistance; said regulator being effectively responsive to said magnetic flux change, in said leg pair, and such fashion as to cause said variable resistance to change in magnitude sufficient to neutralize such magnetic flux change, whereby the current through said load resistance is said signal.

4. The magnetic flux transducer of claim 1, including a magnetic flux permeable annulus positioned coaxially of said magnet, surrounding said magnet, and fixed in position relative to said leg pair.

5. The magnetic flux transducer of claim 4, wherein said single line is straight and the axis of said magnet being straight and aligned with said single line.

6. The magnetic flux transducer of claim 4, wherein said leg pair consists of opposite legs of a single-window four-legged core of magnetic flux saturable material, said annulus forming part of a third leg of said core.

7. The magnetic flux transducer of claim 6, wherein said single line is straight; and the axis of said magnet being straight and aligned with said single line.

8. In a transduction system including a magnetic flux transducer, said magnetic flux transducer comprising a bilaterally symmetric leg pair, each leg of said leg pair being made of magnetically saturable material; a magnet, said magnet having a bilaterally symmetric flux line pattern in a given plane and the flux lines of said pattern diverging away from the line of symmetry of said pattern on both sides of said line of symmetry, and from each other; said leg pair and said magnet being so positioned with respect to each other that flux lines of said magnet intersect said legs and that a plane of symmetry of said leg pair perpendicularly intersects a further plane, said further plane being perpendicularly intersected by said given plane, said further plane also containing said line of symmetry, and said further plane also containing a line of symmetry of said leg pair; mechanism for moving said magnet in said further plane, said mechanism including constraint preventing motion of said magnet as would deflect the first said line of symmetry out of said further plane, the combination with said transducer of magnetic flux producing means arranged to create magnetic flux in each of said leg pair, such magnetic flux being created periodically during an interval of time, each such interval alternating with an interval of time during which no such magnetic flux is being created, being sufficient in itself to saturate each of said leg pair at some point in each interval of creation, and being created always with the same sense; whereby each of said leg pair has a changing flux therein which is the algebraic sum of said magnetic flux created by said magnetic flux producing means and magnetic flux created by flux lines from said magnet intersecting each of said leg pair, the arrangement being that the algebraic sum in one of said leg pair is additive and that the algebraic sum in the other of said leg pair is subtractive; detecting means on said leg pair arranged to have voltages induced therein by the said magnetic fluxes, said detecting means being so constructed and arranged that the net voltage produced therein is zero when only flux due to said magnetic flux producing means is created in said leg pair.

9. A transduction system comyprising the invention of claim 8 in combination with feedback means adjustable to create magnetic flux in each of said leg pair that is equal in magnitude and opposed in sense to that created in each of said leg pair by flux lines of said magnet, said feedback means being thus adjustable in accordance with the net voltage induced in said detecting means; said feedback means producing a signal the magnitude of which represents the amount of magnetic flux created thereby.

10. A two-wire D.C. transmission system including in combination, a constant D.C. source of voltage, a load resistance, and a transducer feedback winding; said source of voltage, said load resistance and said transducer winding being connected in series in a single loop, so that the e.m.f. of said source of voltage drives the same current through said winding and said load resistance; magnetic flux transducer means including said feedback winding and movable magnetic member movable by a condition to be monitored, said transducer means producing an output signal the magnitude of which is a function of the position of said movable magnetic member and of the current through said feedback winding, the arrangement being that if said output signal changes in one of two opposite senses, a change of current in one of two opposite senses will cause said output signal to change in the other of the first said two opposite senses; a current regulator, said current regulator being connected to said loop and being responsive to change in said output signal such as to cause the said current to change in such of the second-said two opposites as will neutralize the last said change in said output signal, whereby the current through said load corresponds to the position of said movable magnetic member.

11. The system of claim 10, wherein said regulator is in the nature of a variable resistance in series with said winding and said source of voltage, said variable resistance being effectively responsive to said output signal to vary its magnitude in accordance with changes in said output signal.

12. A transducer including two magnetic flux saturable, elongated, temporarily-magnetizable elements; first means effectively coupled to each element for periodically inducing magnetic flux at an element-saturating level in each said element simultaneously; second means effectively coupled to each element for inducing magnetic flux in one said element at a less than element-saturating level and aiding the magnetic flux therein induced by said first means, and for simultaneously inducing magnetic flux in the other said element at a less than saturating level and opposing the magnetic flux therein induced by said first means; said second means being an element changeable in position in response to a variable condition and with respect to said elements and producing a steady flux the lines of which intersect the lengths of said elements, whereby the flux induced in said elements is a function of said second means said position, saturation of said one said element is advanced saturation of said other said element is retarded, and said elements do not saturate simultaneously but rather saturate at different times, the difference in which corresponds to said position means for producing a signal corresponding to said difference; and third means for inducing magnetic flux corresponding to said signal in both said elements simultaneously, and in opposition in each said elements, to the flux induced therein by said second means; said third means being adjustable for varying the level of the flux it induces in said elements.

13. A transducer including two magnetic flux saturable, elongated, temporarily-magnetizable elements, said elements being located side by side with their lengths similarly directed; first means effectively coupled to each element for periodically inducing magnetic flux at an element-saturating level in each said element simultaneously; second means effectively coupled to each element for inducing magnetic flux in one said element at a less than element-saturating level and aiding the magnetic flux therein induced by said first means, and for simultaneously inducing magnetic flux in the other said element at a less than saturating level and opposing the magnetic flux therein induced by said first means; said second means being an element changeable in position in response to a variable condition and with respect to said elements and corrpesonding to a single magnetic pole producing a steady flux the lines of which intersect the lengths of said elements, whereby the flux induced in said elements is a function of said second means said position, saturation of said one said element is advanced saturation of said other said element is retarded, and said elements do not saturate simultaneously but rather saturate at different times, the difference in which corresponds to said position and means for producing a signal corresponding to said difference.

14. The transducer of claim 13 including third means for inducing magnetic flux in both said elements simultaneously and, in opposition in each said element, to the flux induced therein by said second means; said third means being adjustable for varying the level of the flux its induces in said elements.

References Cited

UNITED STATES PATENTS 3,128,625  4/1964  Heineman __________ 340—197

FOREIGN PATENTS 939,590  10/1963  Great Britain.
1,193,071  10/1959  France.

RUDOLPH V. ROLINEC, *Primary Examiner.*

R. J. CORCORAN, *Assistant Examiner.*